3,466,361
TECHNETIUM-99m LABELED CHELATES
Powell Richards, Bayport, and James Baranosky, Stony Brook, N.Y., assignors to the United States of America as represented by the United States Atomic Energy Commission
No Drawing. Filed Apr. 18, 1968, Ser. No. 722,208
Int. Cl. A61k *27/04;* C09k *3/00*
U.S. Cl. 424—1                                            3 Claims

ABSTRACT OF THE DISCLOSURE

A process for producing technetium-99m complexes having useful genito-urinary radio-pharmacological properties wherein technetium-99m is joined with calcium-organo chelates in the presence of ferrous sulfate.

PRIOR ART

Advances in scintophotographic instrumentation and availability of an increasing number of radionuclides have been responsible for a rapid growth of nuclear medicine in recent years. The development and introduction of technetium-99m has played an important role in this field.

Technetium-99m was initially suggested for potential medical applications due to a combination of excellent physical characteristics. The 6-hour half-life and absence of beta radiation make feasible the administration of millicurie amounts of the nuclide with relatively low dosage rates to the patient. Its gamma emission of 140 kev. has satisfactory tissue penetration and yet is readily collimated making possible the use of collimators of high sensitivity.

Complexes containing technetium-99m have been used in brain tumor localization; thyroid visualization; liver, spleen, and bone marrow scanning.

The art has been seeking a complex containing technetium-99m which would clear from the blood rapidly, which would not enter metabolic processes, and permit measurements of kidney function as well as aid in visualization of the kidney by scanning means.

It is an object of this invention to provide those skilled in the art with a novel complex containing technetium-99m, and an economic, efficient and reproducible method of preparing the complex, which complex will clear from the blood rapidly through the urinary tract, and which will not enter into metabolic processes and will permit measurements of kidney function as well as aid in visualization of the kidney by scanning means and in brain tumor localization and dynamic vascular studies.

SUMMARY OF THE INVENTION

The invention described herein was made in the course of, or under a contract with the United States Atomic Energy Commission.

A process for preparing a complex containing technetium-99m comprising (a) preparing a saline solution containing technetium-99m ion; (b) reducing of the technetium-99m ion contained in said solution by the addition of ferrous sulfate ($FeSO_4 \cdot 7H_2O$) to said solution; (c) acidifying the reduced solution by the addition of concentrated hydrochloric acid to said solution; (d) contacting the reduced technetium-99m contained in said solution with the alkali metal salt of a chelating agent selected from the group consisting of diethylenetriaminepentaacetic acid, ethylenediaminetetraacetic acid, and citric acid; and (e) adjusting the pH of the contacted solution to about 3.0 by adding concentrated sodium hydroxide thereto and allowing the solution to remain at a pH of about 3.0 for at least one minute, adjusting the pH of the solution to a pH ranging from between about 5.5 to about 6.5 by the further addition of concentrated sodium hydroxide to the solution.

DETAILED DESCRIPTION OF THE INVENTION

The technetium-99m found useful in our invention can be obtained from any conventional source provided that it is in a form having a neutral pH, as pH plays an important role in the complex formation. In general it is best to utilize a 0.15 saline solution having >1 millicurie of technetium-99m/ml.

A large excess of ferrous sulfate ($FeSO_4 \cdot 7H_2O$) 5 to 10 mg. should be employed in order to assure complete reduction of the technetium-99m with the ferrous sulfate, and the solution acidified to 2–3 N in HCl.

From about 1 to 2 parts by weight of the calcium-organo chelate based on the weight of the ferrous sulfate employed should be added to the reduced and acidified solution.

A first adjustment of the pH of the solution to a pH of about 3 with N sodium hydroxide followed by a short waiting period (about one minute) prior to the second adjustment of the pH to a pH between 5.5 and 6.5 to allow complex formation.

The procedure employed in our invention should be carried out at ambient temperatures (20° C. to 40° C.) in order to prevent destruction of the complex. If completely aseptic materials and reaction conditions are employed, then the liquid obtained from the process can be used directly in subjects. If further sterilization is required, it can be readily achieved by methods not requiring heat, such as microfiltration.

Example 10 mg. of ferrous sulfate ($FeSO_4 \cdot 7H_2O$) were added to 4 ml. of a 0.15 N aqueous saline solution containing 20 millicuries of technetium-99m. 1.0 ml. of concentrated hydrochloric acid was added to the mixture to acidify the solution to 2.5 N in HCl. 10 mg. of calcium-diethylene-triaminepentaacetic acid was added to the acidified solution. The pH of the acidified solution was adjusted to a pH of 3 by the addition of N sodium hydroxide to the solution and the solution was stirred for one minute. The calcium salt was selected to prevent the depletion of body calcium. A further increment of sodium hydroxide was added to the solution to adjust the pH of the solution to a pH of 5.5 to render it suitable for intravenous administration.

The above procedure was carried out using aseptic materials and conditions so that the complex containing the technetium-99m could be injected directly in-vivo.

The $Tc^{99m}$-labeled calcium DTPA chelate produced in this example was tested in animals to determine the biological distribution and its suitability for use in nuclear medicine. Samples of the preparation were injected into mice, both peritoneally and intravenously, which were then sacrificed at one, two, four and six hours and body organs removed intact for counting. As a result of these studies it was determined that the technetium chelate was rapidly cleared from the blood and excreted via the urinary tract with approximately 90% excreted in two hours. A urine examination indicated the stability of the labeled chelate with only approximately 2% of the $Tc^{99m}$ activity appearing as unbound petechnetate ion. These tests show the potential of the labeled chelates as agents for kidney visualization, renal function studies, and other dynamic vascular studies using radioisotopic techniques.

We claim:
1. A process for preparing a complex containing technetium-99m comprising:
   (a) preparing a saline solution containing technetium-99m ions;

(b) reducing all of the technetium-99m ions contained in said solution by the addition of ferrous sulfate ($FeSO_4 \cdot 7H_2O$) to said solution;

(c) acidifying the reduced solution by the addition concentrated hydrochloric acid to said solution until the solution is 2.5 N in hydrochloric acid;

(d) contacting the reduced technetium-99m contained in said solution with the alkali metal salt of a chelating agent selected from the group consisting of diethylenetriaminepentaacetic acid, ethylenediaminetetraacetic acid and citric acid; and (e) adjusting the pH of the contacted solution to about 3.0 by adding concentrated sodium hydroxide thereto and allowing the solution to remain at a pH of about 3.0 for at least one minute; adjusting the pH of the solution to a pH ranging from between about 5.5 to about 6.5 by the further addition of concentrated sodium hydroxide to the solution.

2. The process of claim 1 wherein the alkali metal salt of the chelating agent is a calcium salt of a chelating agent.

3. The process of claim 2 wherein said calcium salt of the chelating agent is calcium diethylenetriaminepentaacetic acid.

References Cited

UNITED STATES PATENTS 3,382,152  5/1968  Lieberman et al.
3,150,160  9/1964  Dexter.

OTHER REFERENCES

Stern et al., Tc99-Albumin, 20NSA 27028, August 1966.

Gwyther et al., Aggregated Tc99 Labelled Albumin, 20 NSA 36919, October 1966.

Fockler, Metal Ketoenolate Complexes, 22 NSA 2061, January 1968.

CARL D. QUARFORTH, Primary Examiner

MICHAEL J. McGREAL, Assistant Examiner

U.S. Cl. X.R.

252—301.1; 260—429